United States Patent [19]

Piterskikh et al.

[11] 4,234,525

[45] Nov. 18, 1980

[54] APPARATUS FOR SPRAYING FLUID AND PASTE-LIKE MATERIALS

[76] Inventors: Georgy P. Piterskikh, ulitsa Garibaldi, 4, korpus 1, kv. 11; Stanislav A. Sukhov, Gostinichny proezd, 4a, kv. 71; Vladimir B. Slobodchikov, ulitsa Tukhachevskogo, 33, kv. 21; Gleb F. Rybalchenko, ulitsa Festivalnaya, 12, kv. 20, all of, Moscow, U.S.S.R.

[21] Appl. No.: 20,082

[22] Filed: Mar. 13, 1979

[51] Int. Cl.³ .................. B05B 9/043; B05C 1/14
[52] U.S. Cl. .......................... 261/89; 239/319; 239/329
[58] Field of Search ............ 261/81, 83, 84, DIG. 26, 261/89, 90, 33; 159/16 R; 46/6–8; 239/319, 329

[56] References Cited

U.S. PATENT DOCUMENTS

| 506,450 | 10/1893 | Wertbaugher et al. | 239/319 |
|---|---|---|---|
| 797,315 | 8/1905 | Paasche | 239/319 |
| 2,220,657 | 11/1940 | Placek | 261/90 |
| 2,370,486 | 2/1945 | Paasche | 239/319 |
| 2,547,825 | 4/1951 | King | 46/8 |
| 2,794,292 | 6/1957 | Noble | 46/8 |
| 2,987,847 | 6/1961 | Jones | 46/7 |
| 3,100,947 | 8/1963 | Hellman | 46/8 |
| 3,618,655 | 11/1971 | Lockwood | 159/4 A |
| 3,814,394 | 6/1974 | Murray | 261/DIG. 9 |

*Primary Examiner*—Frank W. Lutter
*Assistant Examiner*—Gregory N. Clements
*Attorney, Agent, or Firm*—Lackenbach, Lilling & Siegel

[57] ABSTRACT

The invention relates to an apparatus for spraying fluid and paste-like materials having a generator of pulsating flow and having an exhaust pipe arranged coaxially with one another. A perforated nozzle for retaining the material is arranged therebetween, and a pipe for feeding the material is also provided. The nozzle for retaining the material is movable along an axis extending in parallel with the axis of a passageway along which the gaseous fluid is fed, and the part of the nozzle filled with the material being sprayed is brought into the cross-section of the passageway during the pause between successive pulsations of the gaseous fluid, and the pipe for feeding the material is arranged outside the passage.

7 Claims, 3 Drawing Figures

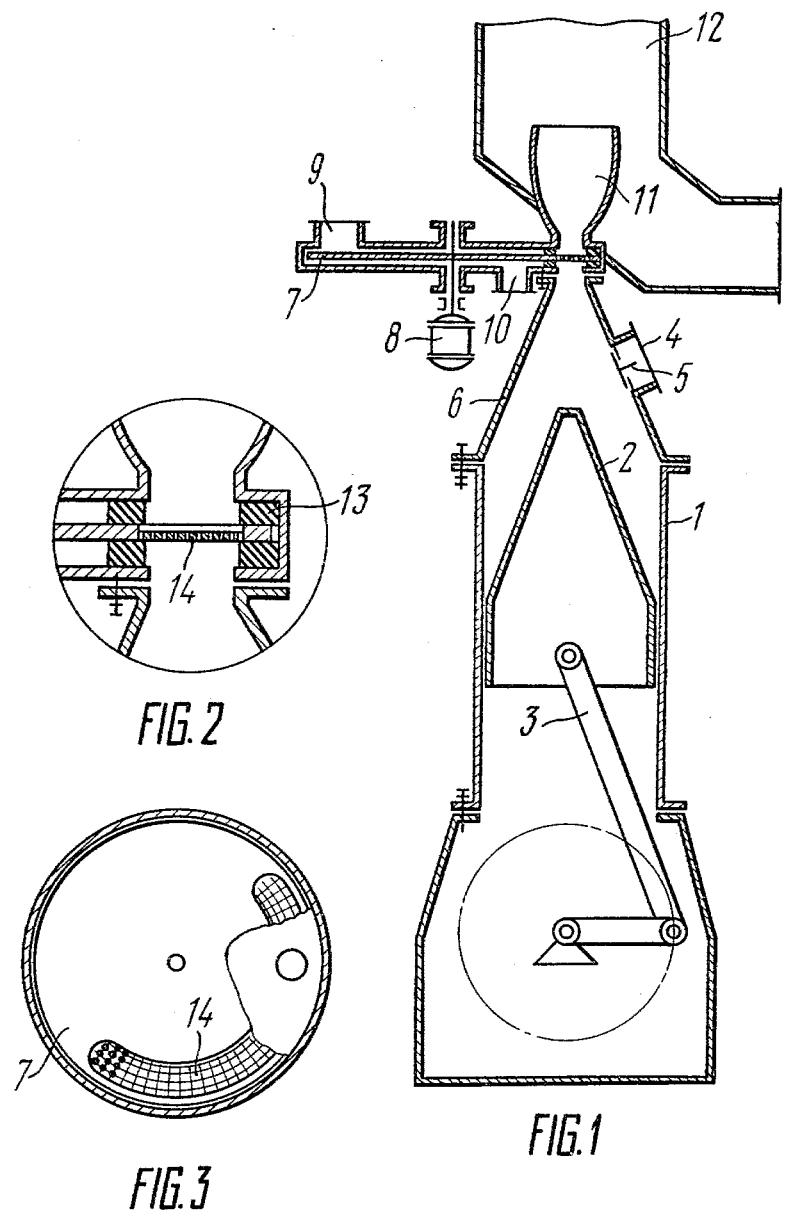

APPARATUS FOR SPRAYING FLUID AND PASTE-LIKE MATERIALS

BACKGROUND OF THE INVENTION

The present invention relates to the spraying technology and may be used for a fine and substantially uniform spraying of fluid and paste-like materials.

The invention may be used in industries employing spraying technique in production processes, such as for spray drying, surface coating with films, aerosol production and other like industries where spraying is employed.

Known in the art are various apparatus for spraying liquids: centrifugal and pneumatic nozzles, rotary spraying discs and cones. Such spraying apparatus generate a dispersion featuring non-commensurable particles, which negatively effects the conduct of some processes, such as drying. Fine particles dry more rapidly than coarse particles and are overheated in a flow of a heat carrier.

The same disadvantage is characteristic of a known apparatus for spraying in a pulsating flow of gas (U.S. Pat. No. 3,618,655,). This apparatus comprises a drying plant in which the material being dried is sprayed in an exhaust pipe of a pulsation combustion chamber. The patent, however, fails to disclose the method and apparatus for distributing the material in the gas stream.

Known in the art is also an apparatus for spraying fluid and paste-like materials with a pulsating gas flow, wherein the material being sprayed is fed to a stationary perforated nozzle installed in an exhaust pipe of a pulsating gas flow generator. The disadvantage of this apparatus resides in the absence of means for uniformly distributing the material among perforations of the nozzle so that the spraying of the material in space is non-uniform and chaotic. In this apparatus, as in the apparatus according to the aforementioned U.S. patent, there is no way of controlling the frequency and amplitude of the pulsations so as to optimize the spraying process as to dispersity and energy requirements.

SUMMARY OF THE INVENTION

The main object of the invention is to provide a spraying apparatus with improved uniformity and fineness of atomization of the material.

Another object of the invention is to reduce the energy requirements for spraying as the material compared to existing pneumatic spraying apparatus using a stationary or pulsating gas flow.

These and other objects are accomplished by an apparatus, for spraying fluid and paste-like materials with a pulsating flow of a gaseous atomizing fluid, having a generator of pulsating flow and an exhaust pipe arranged coaxially with one another, and having a perforated nozzle for retaining the material arranged therebetween. The apparatus also includes a pipe for feeding the material and the perforated nozzle for retaining the material is movable along an axis extending in parallel with the axis of a passage through which the gaseous fluid is fed. A portion of the nozzle filled with the material being sprayed is brought into the cross-section of the passage during the pause between successive pulsations of the gaseous fluid, and the pipes for feeding the material are arranged outside the passage.

The nozzle for retaining the material preferably comprises a peripherally perforated disc.

The invention substantially resides in the following. The provision of the nozzle in the form of a perforated disc rotatable about an axis extending in parallel with the axis of the passage and retaining the material being sprayed results in the possibility of feeding the material into the gas flow during pauses between pulsations of gas. Alternation of the continuous or non-perforated portion and the perforated disc portions enables control of the frequency and duration of pulsation. Introduction of the material into the flow of gas in the form of a layer filling perforations of the disc ensures uniform action of the gas on all material introduced into the passage as the material fills the cross-section of the gas flow. The material entrained with the gas flow is subjected to an additional dispersing action of gas in the exhaust pipe, thus resulting in an improved fineness of dispersion. The provision of the pipe for feeding the material to the disc outside the passage along which the gas flows permits the material to be fed to the disc in an amount ensuring a continuous operation of the apparatus.

The above-mentioned features provide for the possibility of controlling the fineness of dispersion and saving energy due to the fact that pulsation frequency and amplitude of gas pressure are matched with the rotary speed of the disc and the arrangement of the perforations thereon.

BRIEF DESCRIPTION OF THE DRAWINGS

The invention will now be described with reference to a specific embodiment thereof as illustrated in the accompanying drawings, in which:

FIG. 1 is a generally schematic view in longitudinal section of an apparatus for spraying materials for an application where a piston compressor is used as a gas pulsation generator;

FIG. 2 is an enlarged, fragmentary, longitudinal sectional view of a nozzle for retaining the material; and FIG. 3 is a transverse sectional view, partly broken away, of the nozzle for retaining the material.

DESCRIPTION OF THE PREFERRED EMBODIMENTS

As best shown in FIG. 1, the apparatus comprises a generator of pulsating flow of a gaseous fluid, which includes a conventional piston compressor. This construction of the generator enables the reduction of temperature of a spraying fluid at the moment when it acts on a starting material, compared to temperatures developed in pulsation combustion chambers. Thus, a possibility is provided for spraying heat-sensitive materials, such as products of biosynthesis.

The compressor comprises a cylinder 1 and a piston 2, a driven crank lever 3, a pipe 4 for gas intake, and an admission valve 5. A cover plate 6 of the cylinder is made as a cone tapering in the direction of flow of gas expelled by the piston. The cover plate 6 supports a sprayer consisting of a nozzle for retaining the material made in the form of a non-perforated and peripherally perforated disc 7, such as an ultrasonic Laval nozzle movable along an axis extending in parallel with the axis of a passage along which the gaseous fluid is fed. The disc 7 is rotated by an electric motor 8. The material being sprayed is fed to the apparatus along a pipe 9, and any excess material is removed through a pipe 10. An exhaust pipe 11 in the form of a diffuser or ultrasonic nozzle is mounted coaxially with the cylinder 1 of the compressor. The exhaust pipe 11 is arranged in a gas discharge pipe 12. A portion of the disc 7 extending between the cover plate 6 and the exhaust pipe 11 is sealed by means of a device 13 shown enlarged in FIG. 2. The perforation of the disc 7 comprises grates 14 secured to the disc (FIG. 3) or made integral with the disc 7.

The apparatus functions in the following manner. During the admission stroke, the piston 22 is caused by the driven crank lever 3 to move downwards, and an atomizing fluid, such as air is admitted through the pipe 4 and admission valve 5 to the cylinder 1 of the compressor. The disc 7 is caused to rotate and it closes or shuts off, with its continuous non-perforated portion (which can be considered as a delivery valve for said nozzle), the delivery chamber of the compressor to prevent the starting material fed through the pipe 9 from getting to the cylinder 1 of the compressor. In this position, the perforations of the disc 7 are filled with the material being sprayed. During the compression stroke, the piston 2 moves up, the valve 5 is closed, and the disc 7 is caused to rotate so that its perforations are brought to the path of the gas flow, that is between the cover plate 6 and the exhaust pipe 11. The starting material is separated from the grates 14 of the disc 7 and undergoes a primary atomization under the action of a pulsed wave and the high velocity of the atomizing fluid. The atomized material flows with the gas along the exhaust pipe 11, the material being subjected to the action of a shock in the flow of gas contributing to its secondary atomization and substantial acceleration. The gas with the dispersed material thus travels from the exhaust pipe 11 to the gas discharge pipe 12. During the downward movement of the piston 2, the above-described cycle is repeated at a pre-set frequency and amplitude.

Optimization of the spraying process in the above-described apparatus is achieved due to the fact that the perforated part of the nozzle is brought into the stream of the atomizing fluid upon achievement of a pre-set gas pressure in the compressor. For that purpose, the rotation of the compressor shaft and disc is synchronized. Uniformity of spraying is ensured due to the fact that the perforated portion of the disc filled with the material is introduced for a short time interval during which the gas pressure and velocity change very little.

Another example of the use of this invention is the employment of a pulsation combustion chamber as the generator of the pulsating gas flow to replace the compressor. In such application, the disc may be continuously perforated, and synchronization of its rotation with operation of the combustion chamber is necessary to feed a desired quantity of material. Studies have showed that the nozzle for distributing the material may comprise a perforated reciprocating plate or an endless perforated band, rather than a disc.

The invention may be efficiently used in all industries where fine dispersion of fluid and paste-like materials is required.

What is claimed is:

1. An apparatus for spraying a starting material, such as a fluid or a paste-like material by a pulsating flow of a gaseous atomizing agent, comprising: a generator for providing a pulsating flow of a gaseous fluid or atomizing agent; an exhaust pipe communicating with said generator and forming therewith a circular passage along which said gaseous atomizing agent is fed; a nozzle for retaining the starting material to be sprayed is arranged between said generator and said exhaust pipe; said nozzle is perpendicular to said passage and is rotatable about an axis that is parallel to the axis of the passage along which the gaseous atomizing agent is fed; a pipe positioned outside said passage and communicating with said nozzle for feeding starting material to said nozzle; said nozzle having non-perforated and perforated portions with said perforated portions being filled with the starting material to be sprayed; and said nozzle, when rotated into said circular cross-section of said passage during the pause between successive pulsations of said gaseous atomizing agent, is sealed about the peripheral edge of said cross section of said passage with a sealing device.

2. An apparatus according to claim 1, wherein said generator is a compressor, and said exhaust pipe is in the form of a diffuser, with said nozzle mounted in the neck or critical cross-sectional portion of said diffuser, and said non-perforated portion constituting a valve for said nozzle.

3. An apparatus according to claim 1, wherein said nozzle is in the shape of a disc and wherein said sealing device is an apertured seal provided in said passage between said exhaust pipe and said generator.

4. An apparatus according to claim 3, wherein said perforated portion of said disc being of a smaller thickness so as to provide for a layer of said starting material and said disc passing through said apertured sealing device.

5. An apparatus according to claim 3, wherein the perforated portion of said nozzle comprises grates secured to said disc.

6. An apparatus according to claim 3, wherein the perforated portion of said nozzle comprises grates formed integral with said disc.

7. An apparatus according to claim 1, wherein said generator comprises a pulsation combustion chamber.

* * * * *